(12) United States Patent
Sumiya (10) Patent No.: US 9,481,247 B2
(45) Date of Patent: Nov. 1, 2016

(54) VEHICULAR DISPLAY APPARATUS

(71) Applicant: DENSO CORPORATION, Kariya, Aichi-pref. (JP)

(72) Inventor: Minoru Sumiya, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 53 days.

(21) Appl. No.: 14/406,704

(22) PCT Filed: Jun. 11, 2013

(86) PCT No.: PCT/JP2013/003656
§ 371 (c)(1),
(2) Date: Dec. 9, 2014

(87) PCT Pub. No.: WO2013/187049
PCT Pub. Date: Dec. 19, 2013

(65) Prior Publication Data
US 2015/0151636 A1    Jun. 4, 2015

(30) Foreign Application Priority Data

Jun. 13, 2012 (JP) .................................. 2012-134223
May 31, 2013 (JP) .................................. 2013-114959

(51) Int. Cl.
*B60K 37/02* (2006.01)
*G01D 11/26* (2006.01)
*G01D 13/04* (2006.01)

(52) U.S. Cl.
CPC ............... *B60K 37/02* (2013.01); *G01D 11/26* (2013.01); *B60K 2350/943* (2013.01); *G01D 13/04* (2013.01)

(58) Field of Classification Search
CPC B60K 37/02; B60K 2350/943; G01D 11/26; G01D 13/04

USPC .............................. 296/72, 1.06, 1.08, 37.12
See application file for complete search history.

(56) References Cited

U.S. PATENT DOCUMENTS

| 4,309,012 | A | * | 1/1982 | Fukunaga | .............. | B60K 37/02 |
| | | | | | | 248/27.1 |
| 2006/0053910 | A1 | * | 3/2006 | Choi | ...................... | B60K 37/00 |
| | | | | | | 73/866.5 |
| 2006/0266890 | A1 | * | 11/2006 | Bartrom | .............. | B60R 11/0211 |
| | | | | | | 248/27.1 |

FOREIGN PATENT DOCUMENTS

| JP | 0245777 | Y2 | 12/1990 |
| JP | 03008981 | Y2 | 3/1991 |

(Continued)

OTHER PUBLICATIONS

International Search Report and Written Opinion (in Japanese with English Translation) for PCT/JP2013/003656, mailed Aug. 6, 2013; ISA/JP.

*Primary Examiner* — Jason S Morrow
*Assistant Examiner* — E Turner Hicks
(74) *Attorney, Agent, or Firm* — Harness, Dickey & Pierce, P.L.C.

(57) ABSTRACT

A vehicular display apparatus includes a meter main body, and a translucent window held in the meter main body. The translucent window has a translucent glass main body portion, a first extension portion extending in a display direction from an outer edge portion of the main body portion, a second extension portion extending in a backward direction from a leading end portion of the first extension portion, and an engaging tab extending in the backward direction from the second extension portion to be engaged with a catch portion. In the configuration, a warp length that is required for the engaging tab can be ensured by cooperation between the engaging tab and the second extension portion. Therefore, even when the position of the engaging tab is moved in the display direction to ensure a space between a vehicle component and an attachment structure, the attachment structure can be implemented.

14 Claims, 5 Drawing Sheets (56) References Cited

FOREIGN PATENT DOCUMENTS

| JP | H06072022 U | 10/1994 |
| JP | H11101205 A | 4/1999 |
| JP | 2000161996 A | 6/2000 |

\* cited by examiner

VEHICULAR DISPLAY APPARATUS

CROSS REFERENCE TO RELATED APPLICATIONS

This application is a U.S. National Phase Application under 35 U.S.C. 371 of International Application No. PCT/JP2013/003656 filed on Jun. 11, 2013 and published in Japanese as WO 2013/187049 A1 on Dec. 19, 2013. This application is based on and claims the benefit of priority from Japanese Patent Applications No. 2012-134223 filed on Jun. 13, 2012 and No. 2013-114959 filed on May 31, 2013. The entire disclosures of all of the above applications are incorporated herein by reference.

TECHNICAL FIELD

The present disclosure relates to a vehicular display apparatus that is contained in a containing space provided in the interior of a vehicle to display information on the vehicle.

BACKGROUND ART

Conventionally, a vehicular display apparatus has been known which includes a dial plate that displays information, a surrounding portion (referred to also as "facing portion" in Japanese) that surrounds the periphery of the dial plate, and a translucent cover plate that covers an aperture formed by the surrounding portion in the display direction of the dial plate, such as, e.g., the indicating instrument disclosed in Patent Document 1. In such a display apparatus, an attachment structure for causing a cover plate to be held in a surrounding portion typically includes engaging tabs and catch portions. The engaging tabs extend from a flange portion provided at the outer edge portion of the cover plate in the opposite direction of the display direction. The catch portions are provided at the outer peripheral wall surface of the surrounding portion to be engaged with the engaging tabs.

PRIOR ART LITERATURES

Patent Literature

Patent Literature 1: JP 2000-161996 A

SUMMARY OF INVENTION

In a recent vehicle, a vehicle component located in the vicinity of a containing space containing a display apparatus may enter the containing space. In such a case, catch portions and engaging tabs each located on the peripherally outer side of the surrounding portion are forced to move in the display direction so as to avoid interference with the vehicle component or ensure a space between the vehicle component and the catch portions/the engaging tabs.

However, the present inventors have found an issue in that, when the catch portions and the engaging tabs are largely moved in the display direction, it is difficult to implement the attachment structure described above. Specifically, during the step of attaching the cover plate to the surrounding portion, each of the engaging tabs in the attachment structure described above is inserted into the catch portion, while being warped under an external force from the catch portion in contact therewith. Therefore, to allow the engaging tab to be warped, it is necessary to ensure a predetermined length (hereinafter referred to as "warp length") along the display direction for the engaging tab.

However, when the position of the engaging tab is moved in the display direction as described above, it is difficult to ensure the length for the engaging tab. In addition, it is also difficult to ensure a length for a flange portion provided at the outer edge portion of the cover plate, as is the case with the engaging tab. The difficulty thus encountered in ensuring the warp length leads to the difficulty in implementing the attachment structure for causing a translucent member such as the cover plate to be held in the surrounding portion using the catch portions and the engaging tabs.

A method has generally been known which forms a notched groove in the flange portion to ensure the warp length related to the engaging tab. However, when the notched groove is formed in the translucent member of the display apparatus, dust or the like may enter the gap between the surrounding portion and the translucent member through the notched groove. Therefore, it is difficult to apply the formation of the notched groove to the attachment structure of the display apparatus.

The present disclosure has been achieved in view of the foregoing issue and an object thereof is to provide a vehicular display apparatus in which, while a space is ensured between, e.g., a vehicle component and an attachment structure including an engaging tab and a catch portion, a translucent member can be held using the attachment structure.

To achieve the above object, according to an aspect of the present disclosure, a vehicular display apparatus is provided to be contained in a containing space in an interior of a vehicle to display information on the vehicle and include a display assemble and a translucent member held in the display assembly. The display assembly includes a display portion that displays the information, a surrounding wall portion that has a shape surrounding a periphery of the display portion to form a display aperture in a display direction of the display portion, and a catch portion provided at an outer peripheral wall surface of the surrounding wall portion. The translucent member includes a translucent main body portion that covers the display aperture from the display direction, a first extension portion that extends in the display direction from an outer edge portion of the translucent main body portion, a second extension portion that extends in an opposite direction of the display direction from a leading end portion in the display direction of the first extension portion toward a peripherally outer side of the surrounding wall portion, and an engaging tab that extends in the opposite direction from the second extension portion to be engaged with the catch portion.

In the configuration of the aspect, the engaging tab is engaged with the catch portion. The engaging tab extends in the opposite direction of the display direction from the second extension portion: the second extension portion is provided in the display direction of the engaging tab. The second extension portion is configured to extend in the opposite direction from the leading end portion of the first extension portion: the first extension portion is extended in the display direction from the outer edge portion of the translucent main body portion. Accordingly, even when the position of the engaging tab is moved in the display direction, it is possible to ensure a length along the display direction for the second extension portion. As a result, even when it is difficult to ensure a length for the engaging tab as a result of moving the positions of the catch portion and the engaging tab in the display direction, a warp length which is required when the engaging tab is engaged with the catch portion can be ensured by cooperation between the engaging tab and the second extension portion that integrally warps with the engaging tab. This manner enables the implement of the attachment structure that allows the translucent member to be held in the display assembly using the catch portion and the engaging tab each provided on the peripherally outer side of the surrounding wall portion. Therefore, the vehicular display apparatus is implemented in which, while the interference with a vehicle component in the vicinity of a containing aperture is avoided or a space is ensured between a vehicle component and an attachment structure including the engaging tab and the catch portion, the translucent member can be held in the display assembly using the attachment structure.

DESCRIPTION OF DRAWINGS

The above and other objects, features and advantages of the present disclosure will become more apparent from the following detailed description made with reference to the accompanying drawings. In the drawings:

FIG. 6 is a view schematically showing an attachment step of attaching the translucent window to a meter main body or the like;

EMBODIMENTS FOR CARRYING OUT INVENTION

A plurality of embodiments of the present disclosure will be described below on the basis of the drawings. Note that, by designating the components corresponding to each other in the individual embodiments by the same reference numerals, a repeated description thereof may be omitted. When only a part of a configuration is described in each of the embodiments, to the other part of the configuration, the configuration of the other embodiment that has been described previously is applicable. Not only the configurations clearly shown in the description of the embodiments can be combined, but also the configurations of the plurality of embodiments, which are not clearly shown, can partially be combined unless the resulting combination presents a particular interference.

First Embodiment

A combination meter 100 shown in FIGS. 1 to 6 according to a first embodiment of the present disclosure is contained in a containing space 93 provided to be opened in the region of an instrument panel closer to a driver's seat in the interior of a vehicle. The combination meter 100 is placed with the front side thereof facing the driver's seat to display a variety of information on the vehicle.

(Basic Configuration)

A description will be given below of the basic configuration of the combination meter 100. Note that, in the following description, for the sake of convenience, a direction in which the front side of the combination meter 100 faces is assumed to be a display direction SD while a direction opposite to the display direction SD is assumed to be a backward direction BD. In addition, the longitudinal direction of the combination meter 100 is assumed to be a horizontal direction HD while a direction orthogonal to the horizontal direction HD along a gravity direction is assumed to be a vertical direction VD.

Figure 1:
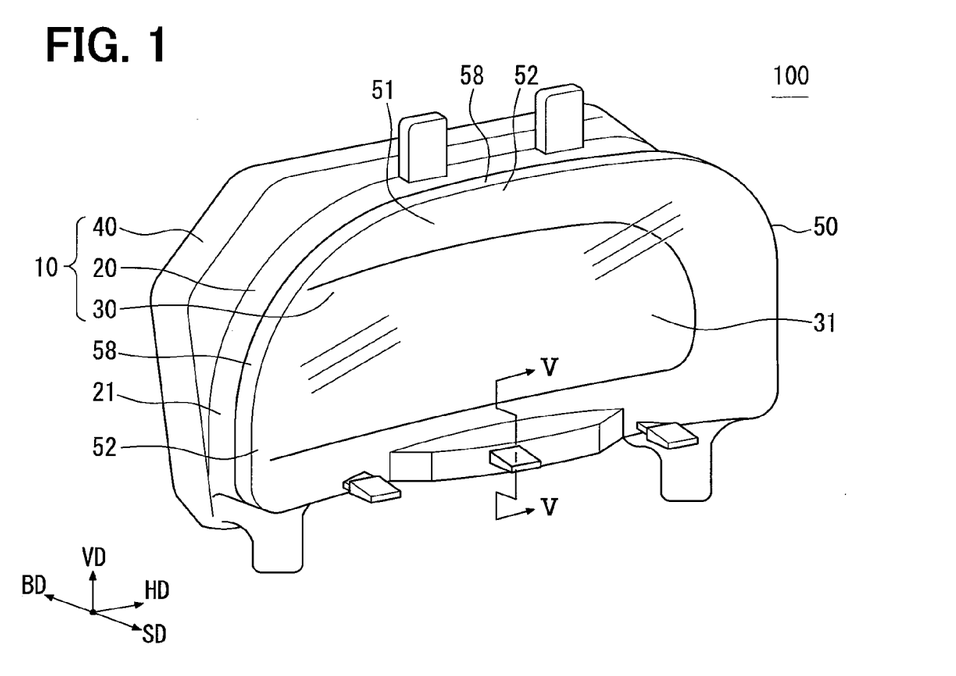
FIG. 1 is a perspective view schematically illustrating a configuration of a combination meter according to a first embodiment of the present disclosure.

As shown in FIG. 1, the combination meter 100 includes a meter main body 10, and a translucent window 50 assembled to the side of the meter main body 10 to be viewed. The meter main body 10 is formed by assembling a dial plate 30, a case 40, a surrounding member 20, and the like to each other.

Figure 5:
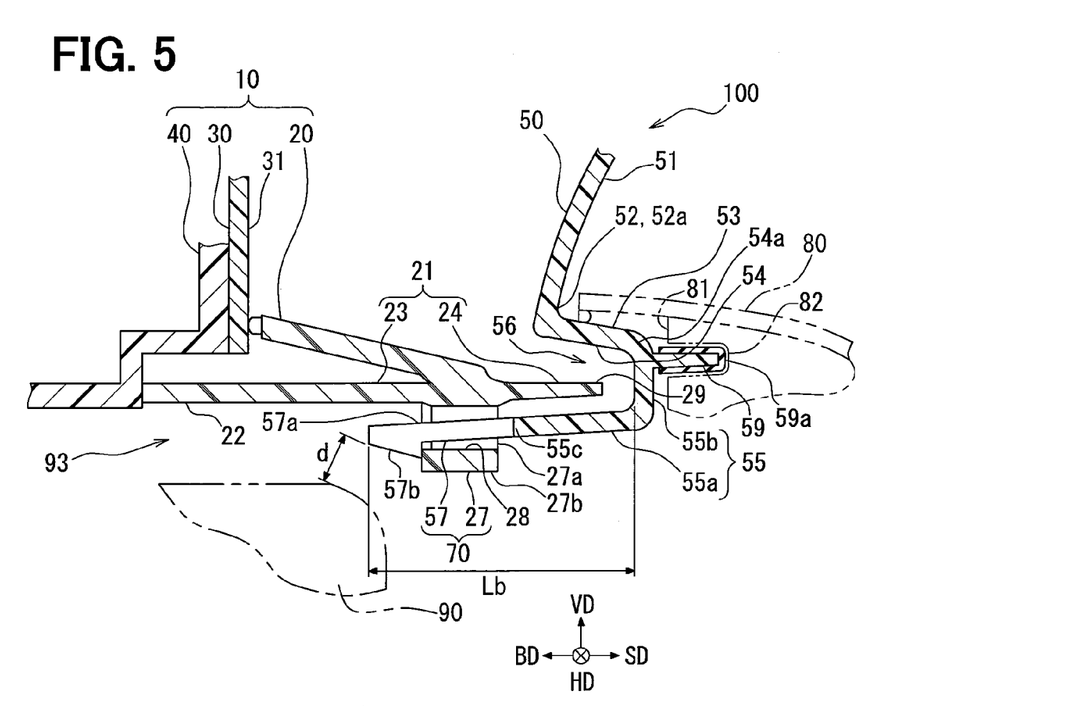
FIG. 5 is a view for illustrating a projecting portion as the characteristic portion of the present disclosure, which is a cross-sectional view along the line V-V of FIG. 1.

The dial plate 30 shown in FIG. 5 is formed by using a translucent resin material as a base material and performing light-shielding printing on the base material. The one of the both surfaces of the dial plate 30 which is located in the display direction SD is provided with a display portion 31 on which scale marks, numbers, and letters are formed by translucent printing. The display portion 31 forms the information display of the vehicle in cooperation with, e.g., an indicator (not shown) which rotates along the display portion 31.

The case 40 is formed of a translucent resin material. The case 40 is located in the backward direction BD of the dial plate 30 to support the dial plate 30 from the backward direction BD. The case 40 contains a circuit board (not shown). The circuit board is provided with a control circuit for performing processing for forming the display of the combination meter 100.

The surrounding member 20 is formed of a translucent resin material such as, e.g., a polypropylene resin and functions also as a light shielding portion. The surrounding member 20 is attached from the display direction SD on the side of the case 40 on which the display portion 31 of the dial plate 30 is formed to hold the dial plate 30 together with the case 40. The surrounding member 20 has a surrounding wall portion 21 and catch portions 27.

As shown in FIG. 1, the surrounding wall portion 21 is formed in a cylindrical shape which surrounds the periphery of the display portion 31 and is wider in the horizontal direction HD than in the vertical direction VD. As shown in FIG. 5, the surrounding wall portion 21 is located in the display direction SD of the dial plate 30; it has a shape surrounding the display portion 31 so as to form a display aperture 29 in the display direction SD of the display portion 31. The display aperture 29 extends through the surrounding member 20 along the display direction SD to allow the display portion 31 to be visually recognized from the display direction SD. The surrounding wall portion 21 includes a main body wall portion 23 and an extended wall portion 24 continuously connected to the main body wall portion 23. The main body wall portion 23 is provided with the catch portions 27. The extended wall portion 24 outwardly extends in the display direction SD from the main body wall portion 23.

The catch portions 27 form an attachment structure 70 in cooperation with engaging tabs 57 described later or the like. The catch portions 27 are provided at a plurality of places at an outer peripheral wall surface 22 of the surrounding wall portion 21. Each of the catch portions 27 includes a pair of supporting portions 27*a* and an engaging portion 27*b*. The respective supporting portions 27*a* protrude from the outer peripheral wall surface 22 toward the peripherally outer side. The pair of supporting portions 27*a* are arranged to be spaced apart from each other in the peripheral direction of the surrounding wall portion 21. The engaging portion 27*b* is continued to the respective leading end portions of the supporting portions 27*a* in the protruding direction thereof to connect the supporting portions 27*a*. The engaging portion 27*b* forms a through hole 28 for allowing the engaging tab to pass therethrough between the engaging portion 27*b* and the outer peripheral wall surface 22.

The translucent window 50 is formed of a translucent resin material such as an acrylic resin or a polycarbonate resin. The translucent window 50 has an outer edge portion 52 which is covered with, e.g., a meter cluster 80 from the display direction SD as a result of the mounting of the combination meter 100 in the vehicle. The meter cluster 80 is a covering member provided in the vehicle which is one of a plurality of members forming the instrument panel. The translucent window 50 is held in the meter main body 10 and includes a glass main body portion 51, an outer peripheral rib 58, and the engaging tabs 57, as shown in FIGS. 2 and 3.

Figure 2:
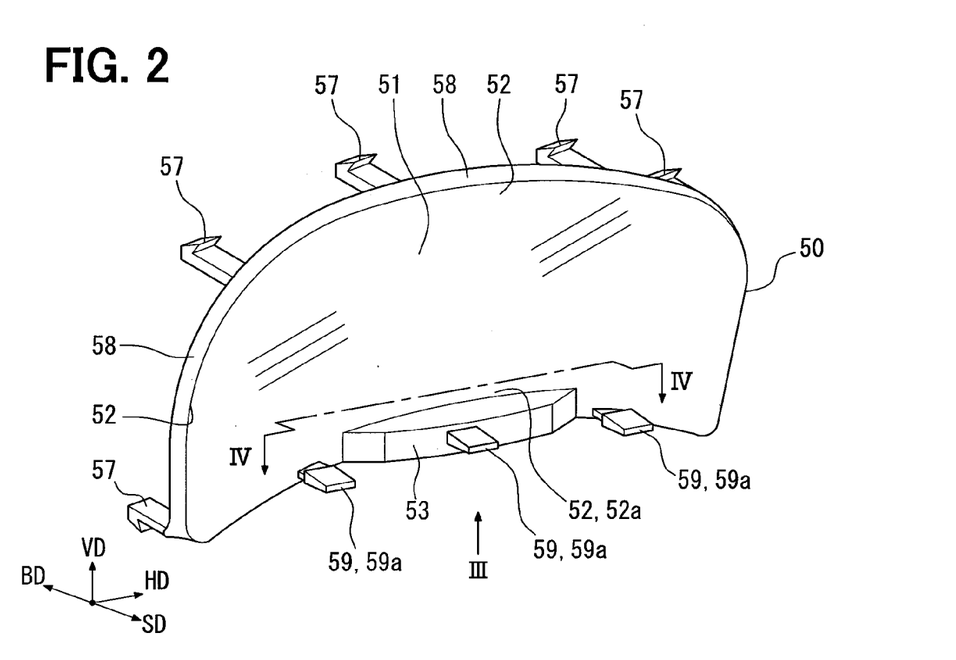
FIG. 2 is a perspective view schematically illustrating a configuration of a translucent window provided in the combination meter according to the first embodiment of the present disclosure.
Figure 4:
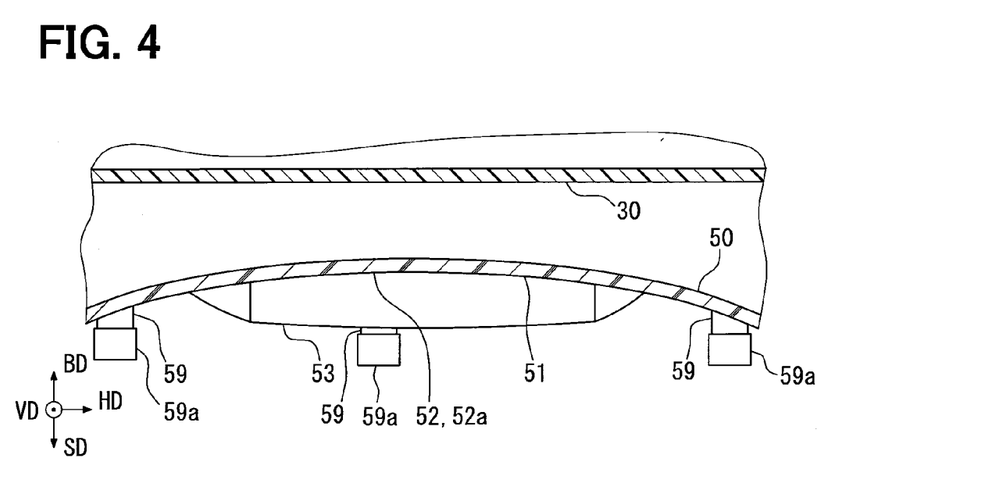
FIG. 4 is view for illustrating the cross-sectional shape of the translucent window, which is a cross-sectional view along the IV-IV line of FIG. 2.

As shown in FIGS. 2 and 5, the glass main body portion 51 is formed in a longitudinal shape which is longer in the horizontal direction HD than in the vertical direction VD to correspond to the shape of the display aperture 29. The glass main body portion 51 is located in the display direction SD of the surrounding member 20 to cover the display aperture 29 from the display direction SD. As also shown in FIG. 4, the cross-sectional shape of the glass main body portion 51 along the horizontal direction HD and the display direction SD is gently curved into a shape which is recessed in the backward direction BD with approach to a middle point in the horizontal direction HD. As a result, a middle portion 52*a* of the glass main body portion 51 in the longitudinal direction is closer to the dial plate 30 than the both end portions thereof in the longitudinal direction. On the other hand, as shown in FIG. 5, the cross-sectional shape of the glass main body portion 51 along the vertical direction VD and the display direction SD is also gently curved into a shape which is recessed in the backward direction BD. By thus being curved, the glass main body portion 51 comes closer to the dial plate 30 as it extends further downward in the vertical direction VD.

Figure 3:
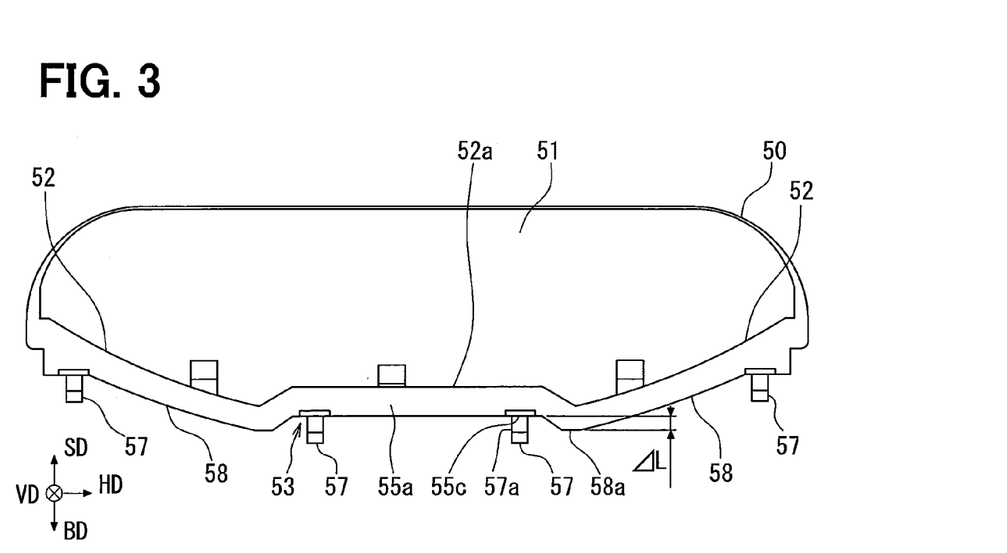
FIG. 3 is a bottom view for illustrating the configuration of the translucent window, which is an arrow view when the translucent window is viewed from the direction of the arrow III of FIG. 2.

The outer peripheral rib 58 shown in FIGS. 1 and 3 extends from the outer edge portion 52 of the glass main body portion 51 in the backward direction BD. The outer peripheral rib 58 is provided to extend along the outer edge portion 52 so as to surround the glass main body portion 51. The outer peripheral rib 58 is located so as to overlap the surrounding wall portion 21 on the peripherally outer side of the surrounding wall portion 21.

The engaging tabs 57 shown in FIGS. 2 and 5 form the attachment structure 70 for allowing the translucent window 50 to be held in the meter main body 10 in cooperation with the catch portions 27. The plurality of engaging tabs 57 are provided at locations corresponding to the catch portions 27 in the display direction SD of the catch portions 27. Each of the engaging tabs 57 is inserted into the catch portion 27 provided at the corresponding position to be engaged with the catch portion 27. Each of the engaging tabs 57 includes a tab main body portion 57*a* and a protruding portion 57*b*.

Each of the tab main body portions 57*a* extends in a strip shape in the backward direction BD from the leading end portion of the outer peripheral rib 58 or from a leading end portion 55*c* of an extension main body portion 55*a* described later. The width of the tab main body portion 57*a* is set slightly smaller than the inner size of the through hole 28 along the horizontal direction HD. Each of the protruding portions 57*b* protrudes from the leading end portion of the tab main body portion 57*a* in the opposite direction of the outer peripheral wall surface 22. The protruding portion 57*b* can pass through the through hole 28 together with the front end portion of the tab main body portion 57*a*. The protruding portion 57*b* that has passed through the through hole 28 comes into contact with the engaging portion 27*b* from the backward direction BD. Accordingly, the movement of the protruding portion 57*b* in the display direction SD is restricted by the engaging portion 27*b*. Thus, the engaging tab 57 is engaged with the catch portion 27 through which the engaging tab 57 is inserted.

(Characteristic Portion)

A detailed description will be given below of a projecting portion 53 of the translucent window 50 or the like as the characteristic portion of the combination meter 100 on the basis of FIGS. 2 to 6.

The projecting portion 53 shown in FIGS. 2 to 4 is provided at the outer edge portion 52 which is at a lower position of the translucent window 50 in the vertical direction VD. The projecting portion 53 projects in the display direction SD from the glass main body portion 51. The projecting portion 53 is located at the middle portion 52*a* of the translucent window 50 in the longitudinal direction. As shown in FIG. 5, the projecting portion 53 is located at a position lower than that of the meter cluster 80 in the vertical direction VD to overlap the meter cluster 80. The projecting portion 53 includes a first extension portion 54 and a second extension portion 55 to form an extension space 56.

The first extension portion 54 is a wall provided to extend along the outer edge portion 52. The first extension portion 54 is located on the peripherally inner side of the outer peripheral wall surface 22. The first extension portion 54 extends from the outer edge portion 52 in the display direction SD. As it extends further in the display direction SD, the first extension portion 54 is slightly inclined on the peripherally outer side of the glass main body portion 51.

Similarly to the first extension portion 54, the second extension portion 55 is a wall portion provided to extend along the outer edge portion 52. The second extension portion 55 extends from a leading end portion 54*a* of the first extension portion 54 in the display direction SD toward the peripherally outer side of the surrounding wall portion 21. The second extension portion 55 includes a connecting portion 55*b*, the extension main body portion 55*a*, and the like. The connecting portion 55*b* is the portion extending from the leading end portion 54*a* toward the peripherally outer side of the glass main body portion 51 and located in the display direction SD of the extended wall portion 24. The connecting portion 55*b* has a form covering the extended wall portion 24 along the vertical direction VD to integrally connect the first extension portion 54 and the extension main body portion 55a. The extension main body portion 55a is the portion bent at generally right angles to the connecting portion 55b and extending in the backward direction BD on the peripherally outer side of the surrounding wall portion 21. As shown in FIG. 3, the length of the extension main body portion 55a along the backward direction BD is set larger than the length of the outer peripheral rib 58 along the backward direction BD. The extension main body portion 55a is formed integrally with the outer peripheral rib 58 to serve also as the outer peripheral rib 58. The extension main body portion 55a is integrally formed with some of the tab main body portions 57a to support the tab main body portions 57a at the leading end portion 55c thereof. Due to the form of the projecting portion 53 projecting in the display direction SD, the proximal end portion of each of the tab main body portions 57a is located in the display direction SD of a portion 58a of the outer peripheral rib 58 which is located at a rearmost position in the backward direction BD (see ΔL in FIG. 3).

The extension space 56 shown in FIG. 5 is formed between the extension main body portion 55a and the first extension portion 54 which are opposed to each other in the vertical direction VD. The extension space 56 is the space surrounded by the first extension portion 54 and the second extension portion 55 and formed in the display direction SD of the outer edge portion 52 located under the glass main body portion 51. The extension space 56 contains therein the extended wall portion 24 extended to a point located in the display direction SD of the outer edge portion 52.

In addition, as shown in FIGS. 2 and 4, the translucent window 50 is provided with a plurality of coin catch portions 59 arranged in the horizontal direction HD. Specifically, the coin catch portions 59 are provided at three portions which are the projecting portion 53 and the portions located on both sides of the projecting portion 53 in the horizontal direction HD. Each of the coin catch portions 59 protrudes in the display direction SD from the front surface of the translucent window 50 exposed in the display direction SD. To the coin catch portions 59, caps 59a are attached. Each of the caps 59a is formed of a material more flexible than a resin material, such as a rubber material or a felt material. As shown in FIG. 5, the cap 59a has a shape covering the coin catch portion 59 from the display direction SD. The coin catch portions 59 are fit into notched portions 82 in a rib 81 provided at the meter cluster 80 as a result of the mounting of the combination meter 100 in the vehicle. Consequently, the caps 59a fill the spaces between the coin catch portions 59 and the notched portions 82.

Of the steps of assembling the combination meter 100 described heretofore, the step of attaching the translucent window 50 to the meter main body 10 will particularly be described below.

Figure 6:
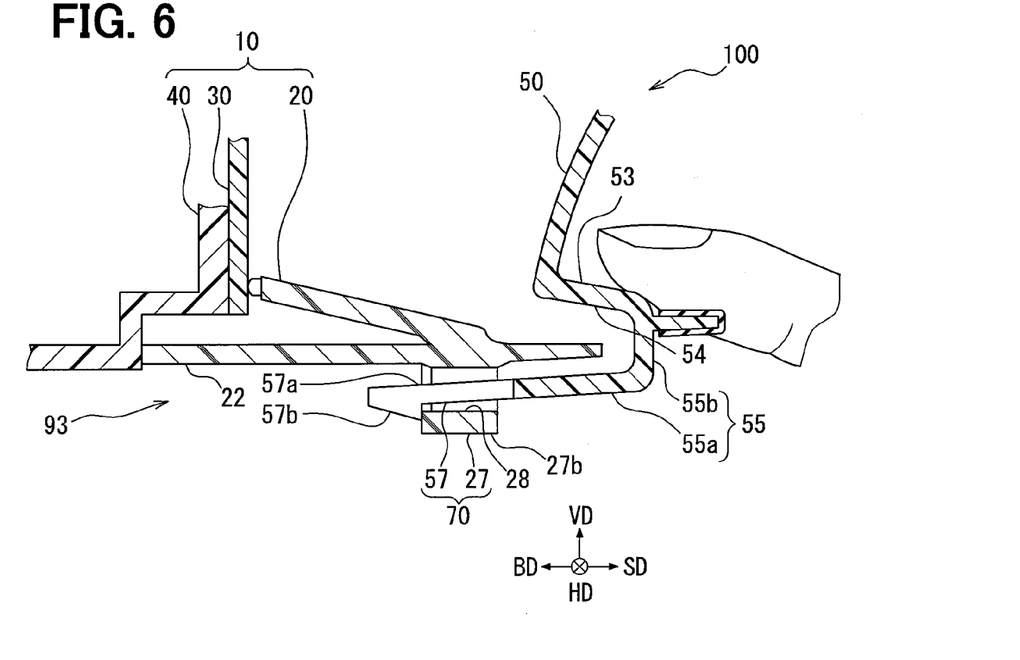

A worker who performs the attachment step shown in FIG. 6 brings the translucent window 50 closer to the meter main body 10 from the display direction SD toward the backward direction BD, while holding, in particular, the projecting portion 53 of the translucent window 50. Thus, the respective protruding portions 57b of the engaging tabs 57 are brought into contact with the respective engaging portions 27b of the catch portions 27 located to face the engaging tabs 57.

The worker applies a force in the backward direction BD to the projecting portion 53 or the like so that each of the protruding portions 57b receives a reaction force from the engaging portion 27b in contact therewith. Consequently, each of the engaging tabs 57 warps integrally with the second extension portion 55 (or the outer peripheral rib 58 (see FIG. 2)) to the peripherally inner side. As a result, the leading end portion of the tab main body portion 57a and the protruding portion 57b pass through the through hole 28 in the backward direction BD to reach the back side of the engaging portion 27b.

Thus, the protruding portion 57b extends over the engaging portion 27b to reduce the warping of the engaging tab 57 and the first extension portion 54 (or the outer peripheral rib 58 (see FIG. 2)). In this manner, the protruding portion 57b that has moved in the direction away from the outer peripheral wall surface 22 comes in contact with the engaging portion 27b from the backward direction BD to restrict the movement of the engaging tab 57 in the display direction SD. As a result of such an engagement of the engaging tab 57 with the catch portion 27, the translucent window 50 is held in the meter main body 10.

Next, an assembly step of assembling the combination meter 100 into the containing space 93 of the instrument panel will be described below.

A worker who performs the assembly step holds the combination meter 100, while placing his finger on the projecting portion 53 provided at the combination meter 100. Then, the worker inserts the combination meter 100 toward the backward direction BD from an aperture formed in the instrument panel into the containing space 93. The combination meter 100 placed at a predetermined position as shown in FIG. 5 is fixed to the structural member of the vehicle using a fastening member such as a screw. Then, the worker attaches a member such as the meter cluster 80, which covers the outer edge portion 52 of the glass main body portion 51 from the display direction SD. In this manner the combination meter 100 is placed in the vehicle.

According to the first embodiment described heretofore, the second extension portion 55 which supports each of the engaging tabs 57 is configured to extend from the leading end portion 54a of the first extension portion 54 in the backward direction BD. Therefore, even when the position of the engaging tab 57 is moved in the display direction SD, it is possible to ensure a length along the display direction SD for the extension main body portion 55a of the second extension portion 55. As a result, even when it is difficult to ensure a length for the engaging tab 57 due to the movement of the attachment structure 70 in the display direction SD, a warp length Lb which is required when the engaging tab 57 is engaged with the catch portion 27 can be ensured by cooperation between the engaging tab 57 and the second extension portion 55. Thus, even when the position of the engaging tab 57 is moved over at least the length ΔL (see FIG. 3) in the display direction SD, the attachment structure 70 including the catch portions 27 and the engaging tabs 57 can be implemented. Accordingly, the combination meter 100 is implemented in which, while a space d is ensured between the engaging tab 57 and a vehicle component 90, the translucent window 50 can be held in the meter main body 10 using the attachment structure 70 including the engaging tabs 57 and the catch portions 27.

Also, according to the first embodiment, the second extension portion 55 can perform the function of the rib which reinforces the glass main body portion 51 on the peripherally outer side together with the outer peripheral rib 58. In addition, since a length in the display direction SD larger than that of the outer peripheral rib 58 is ensured for the second extension portion 55, the second extension portion 55 can exert a reinforcing effect stronger than that of the outer peripheral rib 58. Furthermore, the projecting portion 53 can have a high rigidity due to a U-shaped cross-sectional shape in which the first extension portion 54 and the extension main body portion 55a are connected by the connecting portion 55b. The glass main body portion 51 having the rigidity enhanced by such a reinforcing effect resulting only from the second extension portion 55 and a reinforcing effect resulting from the projecting portion 53 including the second extension portion 55 is inhibited from being deformed during the attachment step. As a result, the force applied to the projecting portion 53 by the worker is more likely to be transmitted to each of the plurality of engaging tabs 57. Accordingly, the engaging tabs 57 and the second extension portion 55 (or the outer peripheral rib 58) are more likely to be integrally warped relative to the glass main body portion 51. This allows an improvement in workability in the attachment step of engaging the engaging tabs 57 with the catch portions 27.

Additionally, according to the first embodiment, by configuring the surrounding wall portion 21 such that the extended wall portion 24 outwardly extends from the main body wall portion 23 and thus gaining the length along the display direction SD, the rigidity of the surrounding wall portion 21 is improved. Accordingly, the main body wall portion 23 supporting the catch portions 27 is inhibited from being deformed. This allows each of the catch portions 27 to more easily exert a reaction force on the engaging tab 57. As a result, the engaging tab 57 and the second extension portion 55 can be warped by properly receiving the reaction force from the catch portion 27. Therefore, the workability of the attachment step which engages the engaging tabs 57 with the catch portions 27 can be improved.

Also, according to the first embodiment, the extended wall portion 24 outwardly extends toward the extension space 56 to be located between the first extension portion 54 and the extension main body portion 55a. Thus, the first extension portion 54 and the extension main body portion 55a of the translucent window 50 and the extended wall portion 24 of the surrounding member 20 are located in interdigitating relation so that dust or the like is less likely to enter the space between the translucent window 50 and the meter main body 10. Therefore, in the combination meter 100, while the translucent window 50 is reliably held using the attachment structure 70, the degradation of the appearance thereof due to the entrance of dust or the like into the combination meter 100 is avoided.

In addition, according to the first embodiment, in the glass main body portion 51 (see FIG. 4) having the middle portion 52a thereof in the longitudinal direction which is curved in the backward direction BD so as to approach the dial plate 30, a space can be formed at the middle portion 52a thereof in the longitudinal direction. Therefore, in the form in which the translucent window 50 is curved, by providing the middle portion 52a with the projecting portion 53, the projecting portion 53 can be contained in the space resulting from the curving of the glass main body portion 51. This configuration can avoid the situation of interference between the vehicle component 90 and the projecting portion 53 that is provided to ensure the warp length Lb.

In addition, according to the first embodiment, even when an article such as, e.g., a coin falls down through the space between the meter cluster 80 and the glass main body portion 51, such a fall of a coin can be interrupted by the projecting portion 53 extending from the glass main body portion 51 in the display direction SD under the meter cluster 80 in the vertical direction VD. The outer edge portion 52 located under the glass main body portion 51 is provided with the projecting portion 53, while the meter cluster 80 is stacked on the first extension portion 54. Thus, the projecting portion 53 is allowed to exert the function of a so-called coin catcher which interrupts the fall of a coin or the like. In addition, even when a coin or the like shows a sign of a further fall through the space between the meter cluster 80 and the projecting portion 53, the fall of the coin is reliably interrupted by the coin catch portions 59 protruding from the projecting portion 53.

Also, according to the first embodiment, the projecting portion 53 gains a thickness along the vertical direction VD by including the connecting portion 55b. This allows the projecting portion 53 to have a form easier to hold. The projecting portion 53 which is easily held by the worker can thereby serve as a position of the combination meter 100 intended to be held when the worker raises the combination meter 100. This suppresses the contact by the worker with the glass main body portion 51 and can reduce the situation of damaging the main body portion 51 while the worker is at work. Moreover, the projecting portion 53 enhances the rigidity of the glass main body portion 51 and accordingly it is possible to reduce the breakage of the translucent window 50 while the worker is at work.

Note that, in the first embodiment, the meter main body 10 is referred to also as a display assembly. The surrounding wall portion 21 is referred to also as a first light shielding wall portion. The translucent window 50 is referred to also as a translucent member. The glass main body portion 51 is referred to also as a translucent main body portion. The meter cluster 80 is referred to also as a covering member. The combination meter 100 is referred to also as a vehicular display apparatus.

Second Embodiment

Figure 7:
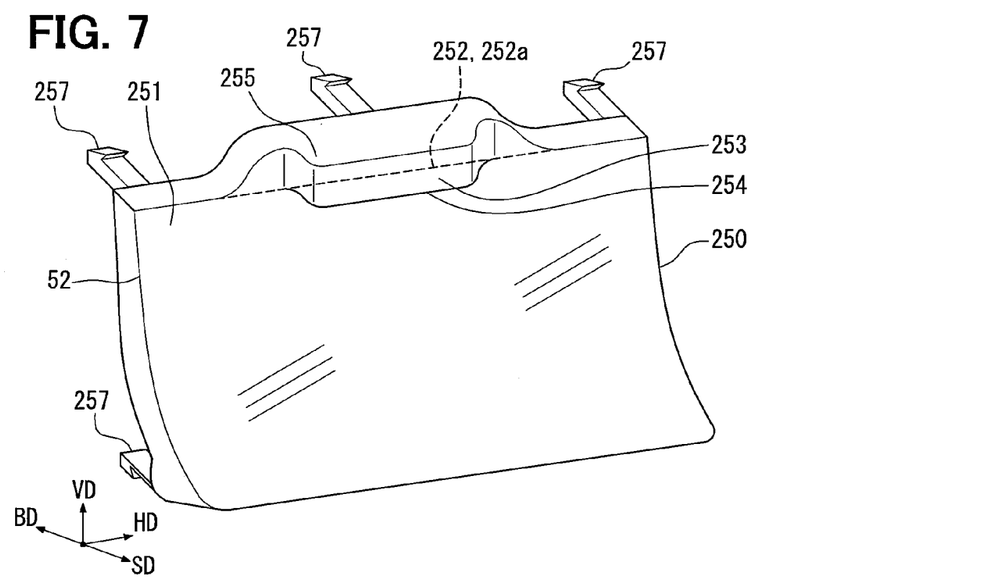
FIG. 7 is a perspective view schematically illustrating a configuration of a translucent window provided in a combination meter according to a second embodiment of the present disclosure.
Figure 8:
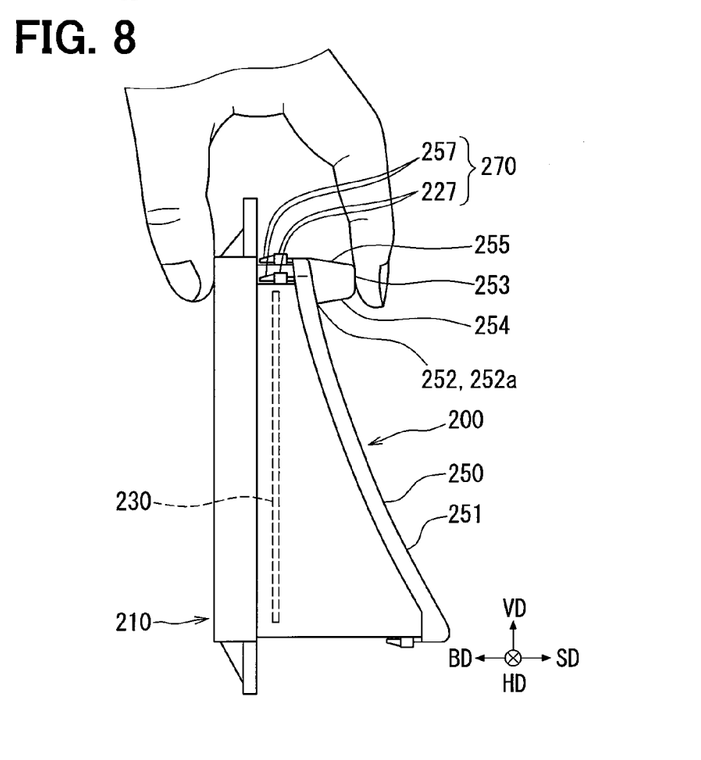
FIG. 8 is a view schematically showing the holding of the combination meter by a worker.

A second embodiment of the present disclosure shown in FIGS. 7 and 8 is a modification of the first embodiment. In a translucent window 250 according to the second embodiment, a projecting portion 253 including a first extension portion 254 and a second extension portion 255 is formed at an outer edge portion 252 located at a higher position in the vertical direction VD. The projecting portion 253 is located at a middle portion 252a of the translucent window 250 in the longitudinal direction. In a cross section along the horizontal direction HD and the display direction SD, a glass main body portion 251 has a flat plate shape along a dial plate 230. In contrast, the glass main body portion 251 has a cross-sectional shape along the vertical direction VD and the display direction SD: the cross-sectional shape is gently curved in the backward direction BD. By thus being curved, the glass main body portion 251 comes closer to the dial plate 230 as it extends further upward in the vertical direction VD.

In the second embodiment described heretofore also, even when an attachment structure 270 including catch portions 227 and engaging tabs 257 is moved in the display direction SD, a warp length which is required for each of the engaging tabs 257 can be ensured. Accordingly, a combination meter 200 is implemented in which, while a space is ensured between the attachment structure 270 and a vehicle component, the translucent window 250 can be held in a meter main body 210 using the attachment structure 270.

In addition, during the work of assembling the combination meter 200 or assembling the combination meter 200 to a vehicle, the worker of each work item will raise the combination meter 200. Therefore, the configuration, which provides the outer edge portion 252 located at a higher position in the vertical direction VD with the projecting portion 253, allows the worker to hold the combination meter 200, while placing his finger on the projecting portion 253 that projects from the glass main body portion 251. This facilitates the raising motion by the worker and allows an improvement in workability in each of work items associated with the combination meter 200.

Note that, in the second embodiment, the meter main body 210 is referred to also as a display assembly. The translucent window 250 is referred to also as a translucent member. The glass main body portion 251 is referred to also as a translucent main body portion. The combination meter 200 is referred to also as a vehicular display apparatus.

Other Embodiments

While the description has been given of the plurality of embodiments according to the present disclosure, the present disclosure should not be construed to be limited to the foregoing embodiments. The present disclosure is applicable to various embodiments within the scope not departing from the gist thereof.

Figure 9:
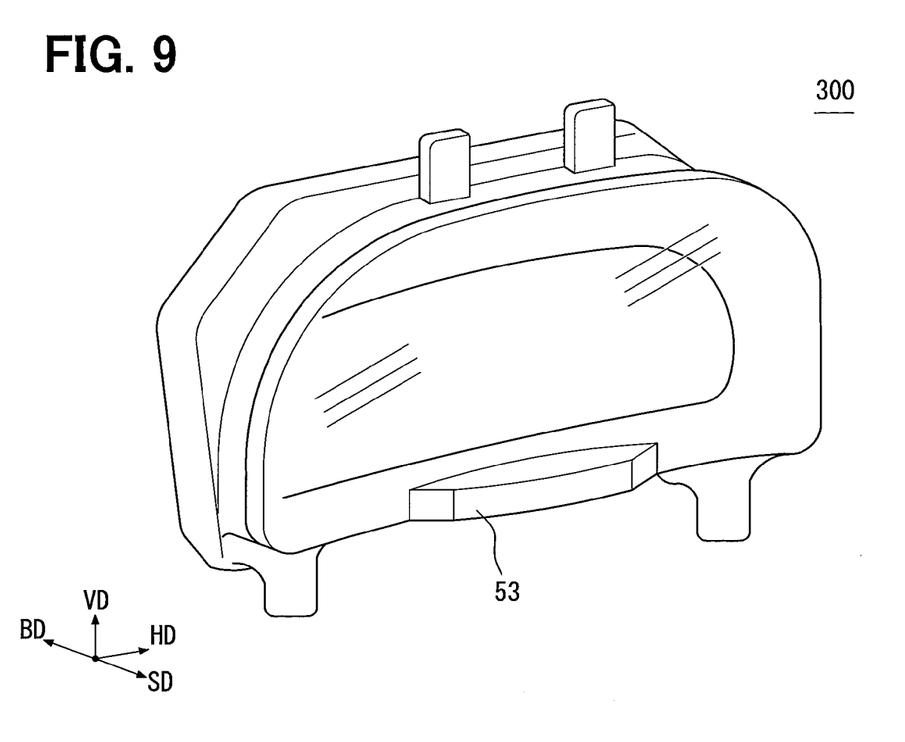
FIG. 9 is a perspective view schematically illustrating a configuration of a combination meter according to a modification of the first embodiment in FIG. 1.

Modification 1 of the foregoing first embodiment, as shown in FIG. 9, omits the three coin catch portions 59 (see FIG. 2). Even such a combination meter 300 according to Modification 1 omitting the coin catch portions 59 permits the projecting portion 53 to perform the function of interrupting the fall of a coin or the like. Another modification may also provide coin catch portions only on both sides of the projecting portion 53 in the horizontal direction HD.

In each of the foregoing embodiments, the projecting portion is provided at the middle portion in the longitudinal direction along the horizontal direction HD. However, the position at which the projecting portion is provided may also be changed as necessary. In addition, a plurality of the projecting portions may also be provided at the outer edge portion of the glass main body portion. Also, the positions of the plurality of engaging tabs outwardly extending from either one of the second extension portion and the outer peripheral rib may be changed as necessary in accordance with the outer shape of the combination meter.

In each of the foregoing embodiments, the space d is ensured between, e.g., the engaging tabs and the vehicle component. However, it may also be possible that, in the combination meter, the interference between the vehicle component and the engaging tabs/the catch portions is avoided by merely moving the engaging tabs and the catch portions in the display direction SD.

In each of the foregoing embodiments, the cross-sectional shape of the projecting portion along the vertical direction VD and the display direction SD is a U-shaped shape. However, the shape of the projecting portion may be changed as necessary. For example, the projecting portion may also have a form in which the first extension portion and the second extension portion lie in folds as a result of omitting the connecting portion 55b extending along the vertical direction VD.

In each of the foregoing embodiments, the second extension portion is provided to extend along the outer edge portion. However, the shape of the second extension portion may also be changed as necessary as long as the engaging tabs can be supported thereby. For example, the second extension portion may also have a shape extending from the first extension portion in the backward direction BD, while having approximately the same width as that of the engaging tab.

The translucent window 50 in the foregoing first embodiment has a so-called inversely warped shape in which the translucent window 50 is curved to come closer to the dial plate 30 as it extends further downward in the vertical direction VD. On the other hand, the translucent window 250 in the foregoing second embodiment has a so-called normally warped shape in which the translucent window 250 is warped to come closer to the dial plate 230 as it extends further upward in the vertical direction VD. Thus, the presence/absence of the curve in the translucent window and the shape of the curve may be changed as necessary in accordance with the outer shape of the combination meter. The translucent window may also be formed of reinforced glass or the like, not the translucent resin material mentioned above.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular display apparatus contained in a containing space provided in an interior of a vehicle to display information on the vehicle, comprising:
  a display assembly including
    a display portion that displays the information,
    a surrounding wall portion that has a shape surrounding a periphery of the display portion to form a display aperture in a display direction of the display portion, and
    a catch portion provided at an outer peripheral wall surface of the surrounding wall portion; and
  a translucent member held in the display assembly, the translucent member including
    a translucent main body portion that covers the display aperture from the display direction,
    a first extension portion that extends in the display direction from an outer edge portion of the translucent main body portion,
    a second extension portion that extends in an opposite direction of the display direction
      from a leading end portion in the display direction of the first extension portion
      toward a peripherally outer side of the surrounding wall portion, and
    an engaging tab that extends in the opposite direction from the second extension portion to be engaged with the catch portion,
  wherein the second extension portion is provided to extend along the outer edge portion of the translucent main body portion.

2. The vehicular display apparatus according to claim 1, wherein the second extension portion includes
  an extension main body portion that forms an extension space between the second extension portion and the first extension portion that is opposed to the second extension portion, and
  a connecting portion that connects the extension main body portion with the leading end portion of the first extension portion.

3. The vehicular display apparatus according to claim 2, wherein the surrounding wall portion includes
  a main body wall portion that is provided with the catch portion, and an extended wall portion that outwardly extends from the main body wall portion toward the extension space.

4. The vehicular display apparatus according to claim 1, wherein the translucent main body portion is formed in a longitudinal shape,
wherein the first extension portion and the second extension portion are located at a middle portion in a longitudinal direction of the translucent member, and
wherein a shape of a cross section of the translucent main body portion along the longitudinal direction is curved toward the opposite direction of the display direction.

5. The vehicular display apparatus according to claim 1, wherein the first extension portion is formed of the outer edge portion that is located under the translucent member in a gravity direction.

6. The vehicular display apparatus according to claim 5, wherein the translucent member has the outer edge portion covered with a covering member from the display direction, the covering member being provided in the vehicle, and
wherein the first extension portion is located under the covering member in the gravity direction to overlap the covering member.

7. The vehicular display apparatus according to claim 1, wherein the first extension portion is formed of the outer edge portion that is located over the translucent member in a gravity direction.

8. A vehicular display apparatus contained in a containing space provided in an interior of a vehicle to display information on the vehicle, comprising:
a display assembly including
a display portion that displays the information,
a surrounding wall portion that has a shape surrounding a periphery of the display portion to form a display aperture in a display direction of the display portion, and
a catch portion provided at an outer peripheral wall surface of the surrounding wall portion; and
a translucent member held in the display assembly, the translucent member including
a translucent main body portion that covers the display aperture from the display direction,
a first extension portion that extends in the display direction from an outer edge portion of the translucent main body portion,
a second extension portion that extends in an opposite direction of the display direction
from a leading end portion in the display direction of the first extension portion
toward a peripherally outer side of the surrounding wall portion, and
an engaging tab that extends in the opposite direction from the second extension portion to be engaged with the catch portion,
wherein the translucent main body portion is formed in a longitudinal shape,
wherein the first extension portion and the second extension portion are located at a middle portion in a longitudinal direction of the translucent member, and
wherein a shape of a cross section of the translucent main body portion along the longitudinal direction is curved toward the opposite direction of the display direction.

9. The vehicular display apparatus according to claim 8, wherein the second extension portion includes
an extension main body portion that forms an extension space between the second extension portion and the first extension portion that is opposed to the second extension portion, and
a connecting portion that connects the extension main body portion with the leading end portion of the first extension portion.

10. The vehicular display apparatus according to claim 9, wherein the surrounding wall portion includes
a main body wall portion that is provided with the catch portion, and
an extended wall portion that outwardly extends from the main body wall portion toward the extension space.

11. The vehicular display apparatus according to claim 8, wherein the second extension portion is provided to extend along the outer edge portion of the translucent main body portion.

12. The vehicular display apparatus according to claim 8, wherein the first extension portion is formed of the outer edge portion that is located under the translucent member in a gravity direction.

13. The vehicular display apparatus according to claim 12, wherein the translucent member has the outer edge portion covered with a covering member from the display direction, the covering member being provided in the vehicle, and
wherein the first extension portion is located under the covering member in the gravity direction to overlap the covering member.

14. The vehicular display apparatus according to claim 8, wherein the first extension portion is formed of the outer edge portion that is located over the translucent member in a gravity direction.

* * * * *